(12) United States Patent
Tanaka et al.

(10) Patent No.: US 9,373,449 B2
(45) Date of Patent: Jun. 21, 2016

(54) SOLID ELECTROLYTIC CAPACITOR

(71) Applicant: SANYO ELECTRIC CO., LTD., Osaka (JP)

(72) Inventors: Yasuo Tanaka, Osaka (JP); Takeshi Sano, Yamagata (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 16 days.

(21) Appl. No.: 14/303,098

(22) Filed: Jun. 12, 2014

(65) Prior Publication Data

US 2014/0293512 A1 Oct. 2, 2014

Related U.S. Application Data

(63) Continuation of application No. PCT/JP2012/077847, filed on Oct. 29, 2012.

(30) Foreign Application Priority Data

Dec. 14, 2011 (JP) .................................. 2011-273082

(51) Int. Cl.
*H01G 9/02* (2006.01)
*H01G 9/032* (2006.01)
*H01G 9/15* (2006.01)

(52) U.S. Cl.
CPC . *H01G 9/032* (2013.01); *H01G 9/15* (2013.01)

(58) Field of Classification Search
USPC .................................................. 361/525, 528
See application file for complete search history.

(56) References Cited

U.S. PATENT DOCUMENTS

| 2001/0003501 A1 | 6/2001 | Hayashi et al. |
| 2003/0111247 A1* | 6/2003 | Araki ..................... H01G 9/025 174/520 |
| 2009/0052119 A1 | 2/2009 | Ota et al. |

FOREIGN PATENT DOCUMENTS

| JP | 2001-167981 A | 6/2001 |
| JP | 2003226743 A * | 8/2003 |
| JP | 2009-071300 A | 4/2009 |
| JP | 2010-209484 A | 9/2010 |
| JP | 2010-245115 A | 10/2010 |

OTHER PUBLICATIONS

International Search Report issued in International Application No. PCT/JP2012/077847 mailed Jan. 22, 2013, with English translation.

* cited by examiner

*Primary Examiner* — Eric Thomas
(74) *Attorney, Agent, or Firm* — McDermott Will & Emery LLP

(57) ABSTRACT

The solid electrolytic capacitor of the present invention includes an anode, a dielectric layer formed on the anode, and a solid electrolyte layer formed on the dielectric layer. The solid electrolyte layer includes an oxide of valve metal. It is beneficial that the solid electrolyte layer contains a salt of valve metal in addition to the oxide of valve metal. Furthermore, it is beneficial that the oxide of valve metal is vanadium pentoxide.

18 Claims, 4 Drawing Sheets

SOLID ELECTROLYTIC CAPACITOR

CROSS REFERENCE TO RELATED APPLICATIONS

This application is a continuation of International Application No. PCT/JP2012/077847, filed Oct. 29, 2012, which claims priority from Japanese Patent Application No. 2011-273082, filed on Dec. 14, 2011, the contents of all of which are incorporated herein by reference in the entirety.

BACKGROUND OF THE INVENTION

The present invention relates to a solid electrolytic capacitor using a solid electrolyte.

Recently, as electronic equipment has been reduced in size and weight, high-frequency capacitors with a smaller size and a larger capacity have been required. As such capacitors, a solid electrolytic capacitor has been proposed, which includes a dielectric layer formed by anodizing a surface of an anode made of a sintered body of a valve metal such as tantalum, niobium, titanium or aluminum, and a solid electrolyte layer provided on the dielectric layer. For the solid electrolyte layer, an electroconductive polymer is used so as to reduce equivalent series resistance (ESR).

However, a dielectric layer formed by anodizing a surface of an anode made of a valve metal or the like has a problem that an insulating property is deteriorated in a defective portion such as a crack and a thin portion in the dielectric layer, which is generated at the time of formation, and leakage current is increased.

In order to solve the above-mentioned problem, Japanese Patent Application Unexamined Publication No. 2001-167981 proposes a technique for reducing leakage current by forming a solid electrolyte layer made of an electroconductive polymer with the use of an iron-based oxidizer and then washing the solid electrolyte layer with a washing solution including, for example, citric acid for reducing the concentration of residual iron ions in the solid electrolyte layer.

However, the method described in Japanese Patent Application Unexamined Publication No. 2001-167981 requires washing a solid electrolyte layer with a washing solution including, for example, citric acid, which makes a manufacturing process complicated.

SUMMARY OF THE INVENTION

An object of the present invention is to provide a solid electrolytic capacitor with reduced leakage current.

A solid electrolytic capacitor of the present invention includes an anode, a dielectric layer formed on the anode, and a solid electrolyte layer formed on the dielectric layer, wherein the solid electrolyte layer includes an oxide of a valve metal.

According to the above-mentioned solid electrolytic capacitor, the oxide of the valve metal in the solid electrolyte layer serves as a resistance in a vicinity of a defective portion of the dielectric layer, and an insulating property of the defective portion of the dielectric layer is increased and leakage current can be reduced even if washing to remove an oxidizer from the solid electrolyte layer is not carried out.

Furthermore, in the solid electrolytic capacitor of the present invention, it is beneficial that the solid electrolyte layer includes a salt of a valve metal in addition to the oxide of the valve metal. Herein, the salt of the valve metal denotes a compound including a cation of metal having valve action and an anion including a conjugate base of acid, for example, a sulfuric acid ion and a chloride ion.

According to the above-mentioned solid electrolytic capacitor, ions of the valve metal are generated when the salt of the valve metal is dissolved, and the ions of the valve metal react with oxygen in the solid electrolyte layer in the vicinity of the defective portion of the dielectric layer, so that the oxide of the valve metal is further formed at the defective portion of the dielectric layer. As a result, the insulating property of the defective portion of the dielectric layer is further increased, and leakage current can be reduced.

Furthermore, in the solid electrolytic capacitor of the present invention, it is beneficial that the salt of the valve metal is a vanadyl compound.

Furthermore, in the solid electrolytic capacitor of the present invention, it is beneficial that the vanadyl compound is vanadyl sulfate or vanadyl oxalate.

Furthermore, in the solid electrolytic capacitor of the present invention, it is beneficial that the oxide of the valve metal is vanadium pentoxide. Thus, since vanadium pentoxide, which is a stable insulating material, is formed at the defective portion of the dielectric layer, the insulating property of the defective portion of the dielectric layer is not easily lowered.

Furthermore, in the solid electrolytic capacitor of the present invention, it is beneficial that the oxide of the valve metal exists at the defective portion of the dielectric layer.

Furthermore, when the salt of the valve metal is vanadyl sulfate or vanadyl oxalate, the vanadyl sulfate or vanadyl oxalate can be allowed to act as an oxidizer for polymerizing monomers for a polymer, and vanadium pentoxide, which is a stable insulating material, can be formed at the defective portion of the dielectric layer.

DETAILED DESCRIPTION OF THE PREFERRED EMBODIMENT

Hereinafter, the present invention is described with reference to specific exemplary embodiments and Examples, but the present invention is not limited to the below mentioned exemplary embodiments and Examples.

Exemplary Embodiment

A configuration of a solid electrolytic capacitor in accordance with an exemplary embodiment is described with reference to FIGS. 1 and 2.

Figure 1:
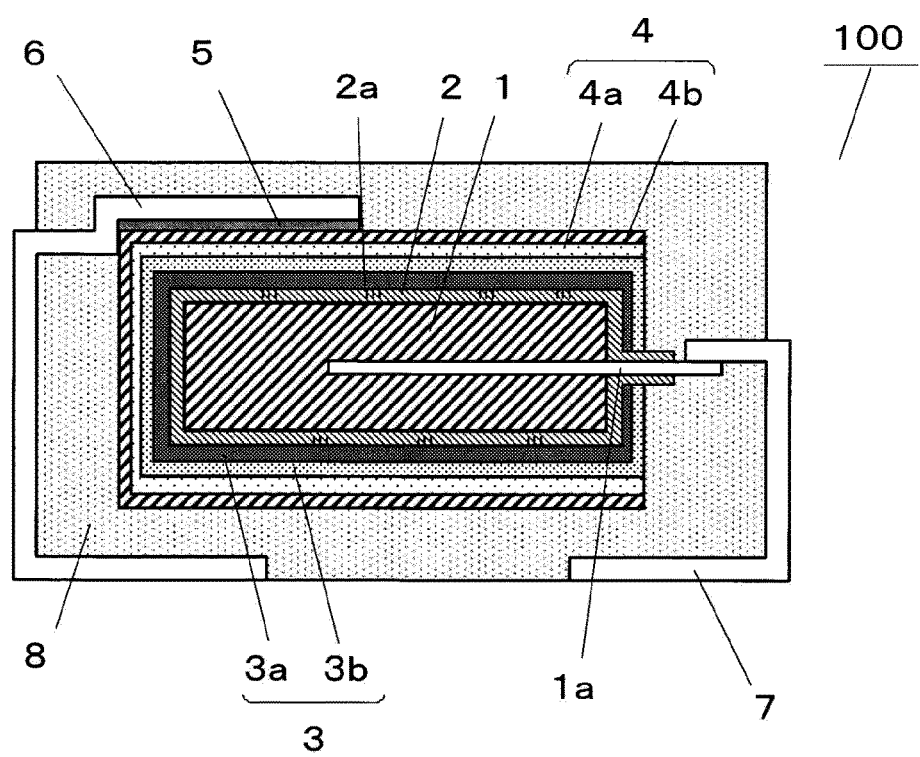
FIG. 1 is a schematic sectional view showing a solid electrolytic capacitor in accordance with an exemplary embodiment of the present invention.

FIG. 1 is a schematic sectional view showing a solid electrolytic capacitor in accordance with an exemplary embodiment of the present invention. A part of anode lead 1a is embedded in anode 1 having a substantially rectangular parallelepiped shape. Dielectric layer 2 is formed on a surface of anode 1. Anode 1 is formed of porous material obtained by sintering a valve metal or an alloy thereof. Herein, examples of the valve metal include a metal such as aluminum, tantalum, niobium and titanium. Furthermore, examples of the alloy of the valve metal include an alloy of valve metals and an alloy of a valve metal and a metal other than the valve metal.

Figure 2:
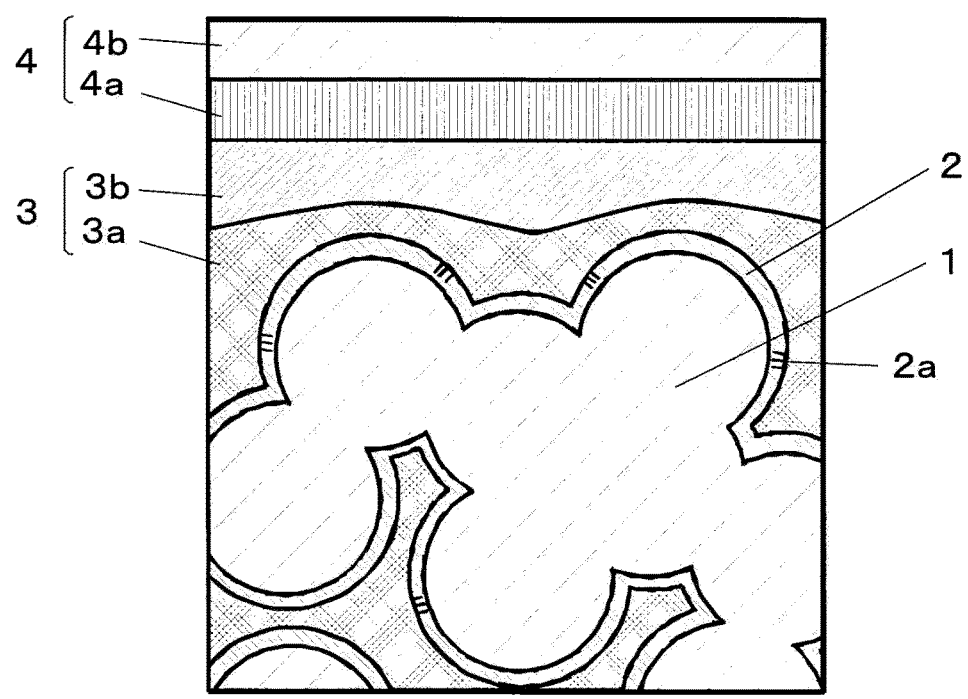
FIG. 2 is a schematic view showing a section of a part of the inside of an anode of the solid electrolytic capacitor in accordance with an exemplary embodiment of the present invention.

FIG. 2 is a schematic view showing a section of a part of the inside of an anode of the solid electrolytic capacitor in accordance with an exemplary embodiment of the present invention. As shown in FIG. 2, anode 1 of porous structure is molded by sintering a large number of powders at intervals from each other, and dielectric layer 2 is formed on surfaces of valve metal powders constituting anode 1. Herein, as dielectric layer 2, the oxide of the valve metal is used. Furthermore, dielectric layer 2 includes defective portion 2a such as a crack.

First electroconductive polymer layer 3a is formed on dielectric layer 2. In this exemplary embodiment, first electroconductive polymer layer 3a is formed by chemical oxidative polymerization. Examples of the electroconductive polymer to be used for first electroconductive polymer layer 3a include polypyrrole, polythiophene, polyaniline, polyacetylene, polyethylene vinylidene, polyfluorene, polyvinyl carbazole, polyvinyl phenol, polyphenylene, polypyridine, and derivatives and copolymers thereof, and the like. In particular, polypyrrole, polythiophene, and polyaniline are suitably used because they can be formed on the dielectric layer easily, and they have high electric conductivity. As polythiophene, poly 3,4-ethylenedioxythiophene is suitably used.

Second electroconductive polymer layer 3b is formed on first electroconductive polymer layer 3a. Second electroconductive polymer layer 3b is formed by electrochemical electrolytic polymerization in this exemplary embodiment. As the electroconductive polymer to be used for second electroconductive polymer layer 3b, the same material as that of first electroconductive polymer layer 3a can be used.

First electroconductive polymer layer 3a and second electroconductive polymer layer 3b constitute electroconductive polymer layer 3. As shown in FIG. 2, electroconductive polymer layer 3 is formed so as to enter into a space between the valve metal powders constituting anode 1 of porous structure and to cover a surface of dielectric layer 2. Note here that electroconductive polymer layer 3 is one example of the "solid electrolyte layer" of the present invention.

Carbon layer 4a is formed on the outer peripheral portion of second electroconductive polymer layer 3b. Silver layer 4b is formed on carbon layer 4a. Herein, carbon layer 4a is a layer including carbon particles, and silver layer 4b is a layer including silver particles. Carbon layer 4a and silver layer 4b constitute cathode 4.

Cathode terminal 6 is electrically connected to silver layer 4b via conductive adhesive layer 5, and anode terminal 7 is electrically connected to anode lead 1a. Furthermore, resin outer package 8 is formed in such a manner that it covers anode 1, dielectric layer 2, electroconductive polymer layer 3 and cathode 4, and it does not cover the end portions of cathode terminal 6 and anode terminal 7.

Next, a method for manufacturing a solid electrolytic capacitor in this exemplary embodiment is described.

In forming anode 1, valve metal powders are molded together with a binder, anode lead 1a is embedded therein, followed by heating. Thus, anode 1 of porous structure obtained by sintering the valve metal powders is formed.

Next, in forming dielectric layer 2, anode 1 of porous structure is immersed in an electrolyte solution to carry out anodization. Thus, dielectric layer 2 made of the oxide of the valve metal constituting anode 1 is formed on the surface of anode 1.

Figure 3A:
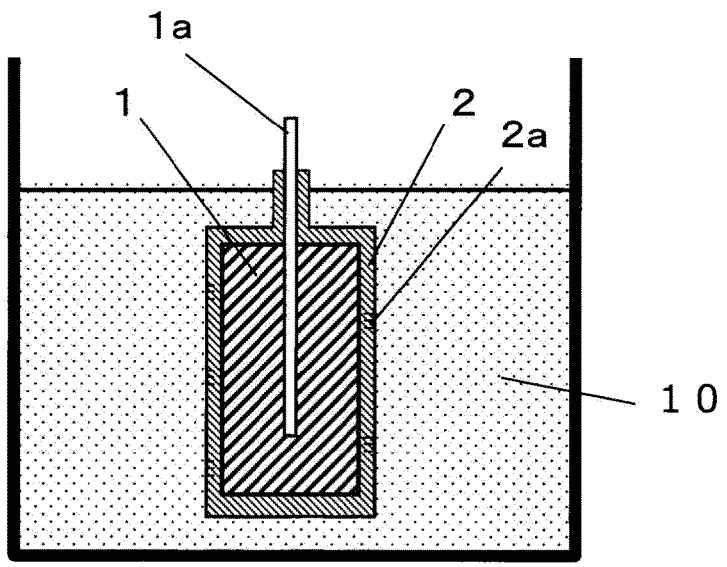
FIGS. 3A and 3B are views each illustrating a part of a process for manufacturing the solid electrolytic capacitor in accordance with an exemplary embodiment of the present invention.
Figure 3B:
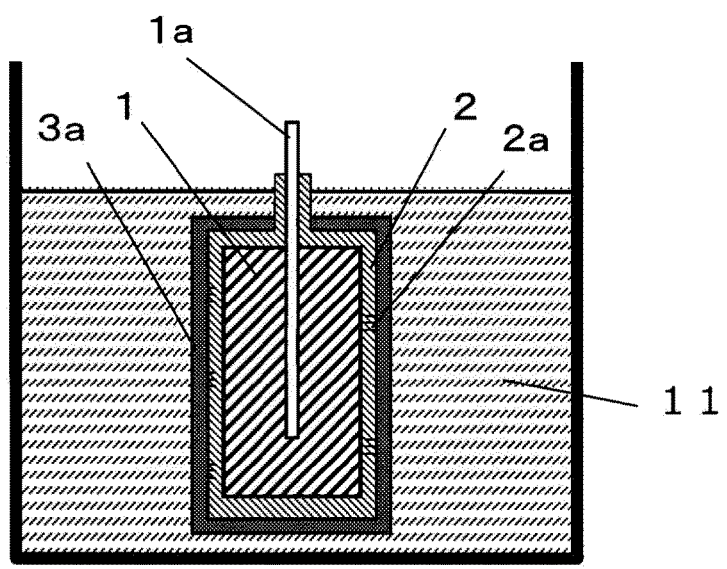

Next, in forming electroconductive polymer layer 3, as shown in FIG. 3A, firstly, anode 1 provided with dielectric layer 2 is immersed in an oxidizer solution including an oxidizer, so that the oxidizer is attached onto dielectric layer 2. Thereafter, as shown in FIG. 3B, anode 1 provided with dielectric layer 2 is immersed in a solution including monomers for the electroconductive polymer, so that chemical oxidative polymerization of the monomers for the electroconductive polymer is carried out by the oxidizer on dielectric layer 2 and first electroconductive polymer layer 3a is formed on dielectric layer 2. Subsequently, anode 1 provided with first electroconductive polymer layer 3a is washed with ethanol or the like so as to remove excessive monomers or oxidizer from first electroconductive polymer layer 3a.

Herein, the oxidizer solution is allowed to contain a oxide of a valve metal or a salt of a valve metal. Herein, the oxide of the valve metal is attached to defective portion 2a of dielectric layer 2 to increase the insulating property of defective portion 2a.

Furthermore, the salt of the valve metal is dissolved in the oxidizer solution to generate ions of the valve metal. The ions of the valve metal react with oxygen in the solid electrolyte layer to form a oxide of the valve metal. For the salt of the valve metal, valve metal chloride or vanadyl salt can be used. In particular, a salt of a valve metal soluble in water is preferable. Examples of the valve metal chloride include titanium trichloride, and examples of the vanadyl salt include vanadyl sulfate, vanadyl oxalate, and the like.

In particular, when vanadyl salt is used, vanadyl ions generated from the vanadyl salt react with oxygen in the solid electrolyte layer so as to form vanadium pentoxide, and the vanadyl salt also acts as an oxidizer for polymerizing monomers for the electroconductive polymer. Therefore, the electroconductive polymer layer can be formed without using any other oxidizers.

The concentration of the oxide of the valve metal or the salt of the valve metal to be contained in the oxidizer solution is preferably in the range from 0.1 to 50 wt. %. When the concentration of the oxide of the valve metal is less than 0.1 wt. %, an effect of increasing the insulating property of defective portion 2a of dielectric layer 2 is low. When the concentration is higher than 50 wt. %, the conductivity of electroconductive polymer layer 3 itself is lowered, thus causing ESR to be increased. It is further preferable that the concentration of the oxide of the valve metal or the salt of the valve metal is in the range from 1 to 20 wt. %.

Next, anode 1 provided with first electroconductive polymer layer 3a is immersed in an aqueous solution including monomers for the electroconductive polymer, and an electric current is applied by using first electroconductive polymer layer 3a as an anode so as to polymerize the monomers for the electroconductive polymer by electrochemical electrolytic polymerization. Thus, second electroconductive polymer layer 3b is formed on first electroconductive polymer layer 3a. Herein, it is preferable that an aqueous solution including monomers for the electroconductive polymer is allowed to contain a compound such as aromatic sulfonate as a dopant of second electroconductive polymer layer 3b. Thus, the conductivity of second electroconductive polymer layer 3b can be improved.

Next, in forming cathode 4, carbon paste is coated on the outer peripheral portion of second electroconductive polymer layer 3b and dried so as to form carbon layer 4a. Silver paste is coated on carbon layer 4a and dried so as to form silver layer 4b.

In this way, a solid electrolytic capacitor in accordance with the exemplary embodiment is formed.

Thereafter, anode terminal 7 is welded to anode lead 1a of the solid electrolytic capacitor, cathode terminal 6 is connected onto silver layer 4b via conductive adhesive layer 5. Resin outer package 8 is provided to cover the solid electrolytic capacitor by transfer molding method using epoxy resin such that end portions of cathode terminal 6 and anode terminal 7 are exposed. Thus, the formation of solid electrolytic capacitor 100 shown in FIG. 1 is completed.

Example 1

As shown in FIG. 1, anode 1 is made of porous material into which a part of anode lead 1a is embedded, and which is obtained by sintering tantalum powders. Furthermore, anode 1 has a rectangular parallelepiped shape of 4.5 mm×3.3 mm×1.0 mm, and has a side surface (3.3 mm×1.0 mm) into which anode lead 1a is embedded.

Dielectric layer 2 made of tantalum oxide is formed on a surface of tantalum powders constituting anode 1.

First electroconductive polymer layer 3a made of poly 3,4-ethylenedioxythiophene is formed on the surface of dielectric layer 2. First electroconductive polymer layer 3a contains vanadium pentoxide and vanadyl sulfate.

Second electroconductive polymer layer 3b made of polypyrrole is formed on first electroconductive polymer layer 3a. On second electroconductive polymer layer 3b, carbon layer 4a and silver layer 4b constituting cathode 4 are formed sequentially.

Anode terminal 7 is connected to anode lead 1a, and cathode terminal 6 is connected to silver layer 4b via conductive adhesive layer 5.

Furthermore, resin outer package 8 is formed so as to cover the above-mentioned anode 1, dielectric layer 2, electroconductive polymer layer 3, cathode 4, a part of cathode terminal 6 and a part of anode terminal 7.

Next, a method for manufacturing a solid electrolytic capacitor of Example 1 is described.

In forming anode 1, tantalum powders and a binder are molded together, anode lead 1a is embedded in the molded product, and then the molded product is heated. Thus, anode 1 made of porous material obtained by sintering tantalum powders is formed. Anode 1 has a rectangular parallelepiped shape of 4.5 mm×3.3 mm×1.0 mm, and has side surface (3.3 mm×1.0 mm) into which anode lead 1a is embedded.

Next, in forming dielectric layer 2, anode 1 is anodized in a phosphoric acid aqueous solution so as to form dielectric layer 2 on the surface of anode 1. Herein, a film thickness of dielectric layer 2 is determined by a voltage applied to anode 1.

Next, in forming electroconductive polymer layer 3, firstly, anode 1 provided with dielectric layer 2 is immersed in an oxidizer solution including 5 wt. % vanadyl sulfate, 1 wt. % sulfuric acid and water, followed by lifting up anode 1 and then drying thereof. Thereafter, anode 1 is immersed in a 3,4-ethylenedioxythiophene solution followed by lifting up anode 1 and subjecting anode 1 to polymerization reaction of 3,4-ethylene dioxythiophene in an incubator. Thus, first electroconductive polymer layer 3a including poly 3,4-ethylenedioxythiophene is formed on dielectric layer 2.

Herein, it seems that vanadyl sulfate in the oxidizer solution acts as an oxidizer for polymerizing 3,4-ethylenedioxythiophene that is a monomer for a polymer, and vanadium ions generated from vanadyl sulfate remaining after polymerization react with oxygen in first electroconductive polymer layer 3a to form vanadium pentoxide at defective portion 2a of dielectric layer 2.

In particular, in the below-mentioned aging treatment, a minute amount of electric current flows at defective portion 2a of dielectric layer 2, and reaction between vanadium ions and oxygen proceeds. Therefore, vanadium pentoxide is easily formed at defective portion 2a of dielectric layer 2.

Next, anode 1 provided with first electroconductive polymer layer 3a is immersed in an aqueous solution including pyrrole and sodium alkylnaphthalenesulfonate, an electric current of 0.5 mA is allowed to flow by using first electroconductive polymer layer 3a as an anode, and second electroconductive polymer layer 3b including polypyrrole is formed. Thus, in this Example, it seems that only first electroconductive polymer layer 3a contains vanadium pentoxide, and second electroconductive polymer layer 3b does not contain vanadium pentoxide.

Next, in forming cathode 4, carbon paste is coated on second electroconductive polymer layer 3b on the outer peripheral portion of anode 1 and dried so as to form carbon layer 4a. Silver paste is coated on carbon layer 4a and dried so as to form silver layer 4b.

Thereafter, anode terminal 7 is welded onto anode lead 1a, cathode terminal 6 is connected to silver layer 4b via conductive adhesive layer 5. Anode 1, dielectric layer 2, electroconductive polymer layer 3, cathode 4, a part of cathode terminal 6 and a part of anode terminal 7 are covered with resin outer package 8 by transfer molding method using epoxy resin such that end portions of cathode terminal 6 and anode terminal 7 are exposed.

Finally, solid electrolytic capacitor A1 is produced by aging treatment in which it is left in an environment at a temperature of 135° C. for 70 minutes and 2.5 V of rated voltage is applied between cathode terminal 6 and anode terminal 7.

Example 2

In Example 2, solid electrolytic capacitor A2 is produced by the same method as in Example 1 except that a solution including 5 wt. % vanadyl oxalate, 1 wt. % sulfuric acid and water is used as an oxidizer solution.

Herein, it seems that vanadyl oxalate acts as an oxidizer for polymerizing 3,4-ethylenedioxythiophene that is a monomer for a polymer, and vanadium ions generated from vanadyl oxalate remaining after polymerization react with oxygen in first electroconductive polymer layer 3a to form vanadium pentoxide at defective portion 2a of dielectric layer 2.

Example 3

In Example 3, solid electrolytic capacitor A3 is produced by the same method as in Example 1 except that a solution including 20 wt. % hydrogen peroxide, 1 wt. % vanadium pentoxide, 1 wt. % sulfuric acid and water is used as an oxidizer solution.

Herein, hydrogen peroxide acts as an oxidizer for polymerizing 3,4-ethylenedioxythiophene that is a monomer for a polymer. On the other hand, vanadium pentoxide seems to be attached to defective portion 2a of dielectric layer 2.

Example 4

In Example 4, solid electrolytic capacitor A4 is produced by the same method as in Example 1 except that a solution including 20 wt. % hydrogen peroxide, 1 wt. % titanium trichloride, 1 wt. % sulfuric acid and water is used as an oxidizer solution.

Herein, hydrogen peroxide acts as an oxidizer for polymerizing 3,4-ethylenedioxythiophene that is a monomer for a polymer. On the other hand, it seems that titanium trichloride is dissolved in the oxidizer solution to generate titanium ions, and the titanium ion react with oxygen to form titanium oxide on defective portion 2a of dielectric layer 2.

Example 5

In Example 5, solid electrolytic capacitor A5 is produced by the same method as in Example 1 except that a solution including 20 wt. % para-toluenesulfonic acid iron, 1 wt. % vanadium pentoxide and butanol is used as an oxidizer solution.

Herein, para-toluenesulfonic acid iron acts as an oxidizer for polymerizing 3,4-ethylenedioxythiophene that is a monomer for a polymer. On the other hand, it seems that vanadium pentoxide is attached to defective portion 2a of dielectric layer 2.

Comparative Example 1

In Comparative Example 1, solid electrolytic capacitor Y1 is produced by the same method as in Example 1 except that a solution including 20 wt. % para-toluenesulfonic acid iron and butanol is used as an oxidizer solution.

In this Comparative Example 1, unlike Examples 1 to 5, an oxide of a valve metal or a salt of a valve metal is not contained in the oxidizer solution. On the other hand, since para-toluenesulfonic acid iron as an iron-based oxidizer is contained, an iron ion seems to remain in first electroconductive polymer layer 3a.

(Evaluation of Properties of Solid Electrolytic Capacitors)

Leakage current is measured in 92 each of electrolytic capacitor A1 to A5 and Y1 produced in the above-mentioned Examples 1 to 5 and Comparative Example 1.

For measurement of leakage current, a value of electric current flowing between cathode terminal 6 and anode terminal 7 is measured at the time of 40 seconds after a rated voltage (2.5 V) is applied, and the resultant value is defined as leakage current. A number of solid electrolytic capacitors having a leakage current value of not more than a reference value (0.1 mA) is counted, and a rate of the number of the solid electrolytic capacitors having a leakage current value of not more than the reference value to the total number of measured solid electrolytic capacitors is calculated. The measurement results are shown in Table 1.

TABLE 1

|  | Rate of number of solid electrolytic capacitors having leakage current of not more than reference value (%) |
| --- | --- |
| Solid electrolytic capacitor A1 | 85.9 |
| Solid electrolytic capacitor A2 | 80.4 |
| Solid electrolytic capacitor A3 | 54.3 |
| Solid electrolytic capacitor A4 | 46.7 |
| Solid electrolytic capacitor A5 | 26.1 |
| Solid electrolytic capacitor Y1 | 14.1 |

Solid electrolytic capacitor A1 of Example 1 shows that the rate of the number of solid electrolytic capacitors having a leakage current of not more than the reference value is 85.9% which is the highest. This seems to be because vanadyl sulfate in electroconductive polymer layer 3 is oxidized with a slight amount of leakage current flowing at defective portion 2a of dielectric layer 2 during an energization of an aging treatment, insulating vanadium pentoxide is formed at defective portion 2a of dielectric layer 2, and the insulating property of defective portion 2a is increased and the leakage current is reduced.

Figure 4:
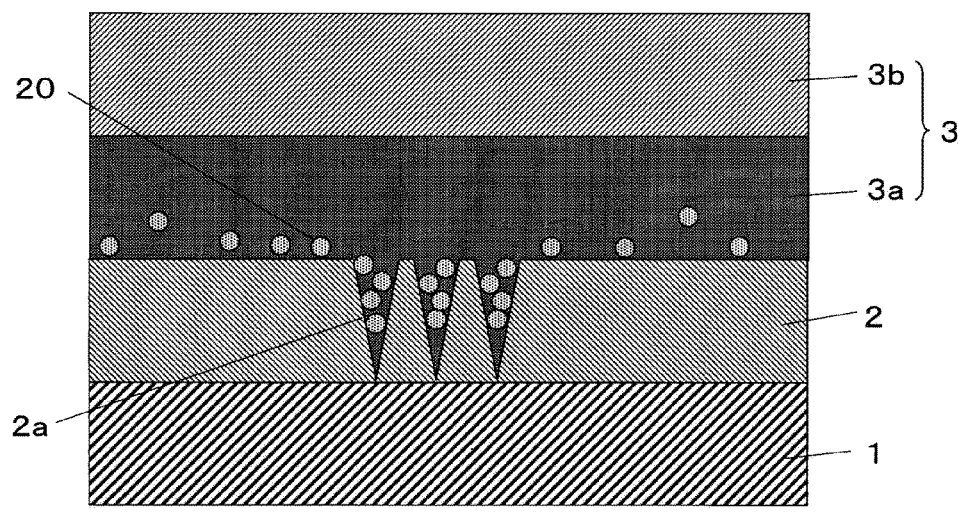
FIG. 4 is a sectional view for illustrating a principle that an insulating property is increased in a vicinity of defective portion 2a in dielectric layer 2 of the solid electrolytic capacitor in accordance with an exemplary embodiment of the present invention.

FIG. 4 is a sectional view for illustrating a principle that an insulating property is increased in a vicinity of defective portion 2a of dielectric layer 2. As shown in FIG. 4, first electroconductive polymer layer 3a is formed also in the inside of defective portion 2a. In first electroconductive polymer layer 3a in the vicinity of defective portion 2a, oxide of valve metal 20 such as vanadium pentoxide exists. Therefore, oxide of valve metal 20 that is an insulating material prevents a conductive route from being formed when first electroconductive polymer layer 3a and anode 1 are brought into contact with each other via defective portion 2a, thus suppressing generation of leakage current.

Herein, oxide of valve metal 20 may be formed by reaction between valve metal ions generated when a salt of a valve metal is dissolved and oxygen in the solid electrolyte layer.

Furthermore, also in solid electrolytic capacitor A2 of Example 2 in which vanadyl oxalate is used, the rate of the number of solid electrolytic capacitors having a leakage current of not more than the reference value is 80.4%, which is the same level as in solid electrolytic capacitor A1. This is considered to be the same reason as in solid electrolytic capacitor A1 mentioned above.

Furthermore, the rates of the number of solid electrolytic capacitors having leakage current of not more than the reference value in solid electrolytic capacitors A1 and A2 are higher than 46.7% that is the rate in solid electrolytic capacitor A4 of Example 4. This is considered to be as follows. Similar to solid electrolytic capacitors A1 and A2, also in solid electrolytic capacitor A4, titanium ions generated from titanium trichloride in an oxidizer solution react with oxygen, and titanium oxide is formed at defective portion 2a of dielectric layer 2. However, vanadium pentoxide in solid electrolytic capacitors A1 and A2 has higher stability than titanium oxide in solid electrolytic capacitor A4, and the insulating property of defective portion 2a can be sufficiently increased.

Furthermore, the rates of the number of solid electrolytic capacitors having leakage current of not more than the reference value in solid electrolytic capacitors A1 and A2 are higher than 54.3% and 26.1% which are rates in solid electrolytic capacitors A3 and A5 of Examples 3 and 5 in which electroconductive polymer layer 3 is formed by allowing insulating vanadium pentoxide to be contained in the oxidizer solution. The reason for this seems to be as follows. In solid electrolytic capacitors A3 and A5, vanadium pentoxide is attached to defective portion 2a of dielectric layer 2 and suppresses leakage current, but a conductive path of electroconductive polymer layer 3 remains between vanadium pentoxide and dielectric layer 2. On the other hand, since in solid electrolytic capacitors A1 and A2, vanadium pentoxide is formed directly on defective portion 2a of dielectric layer 2, the insulating property of defective portion 2a can be sufficiently increased.

Furthermore, the rate of the number of solid electrolytic capacitors having leakage current of not more than the reference value in solid electrolytic capacitors A1 to A4 is significantly larger as compared with that in solid electrolytic capacitor A5, and the difference therebetween becomes larger. The reason for this seems to be as follows. In solid electrolytic capacitor A5, since the oxidizer solution includes para-toluenesulfonic acid iron, iron ions of para-toluenesulfonic acid iron remaining in electroconductive polymer layer 3 form a conductive path in defective portion 2a, and an effect of suppressing leakage current by vanadium pentoxide is reduced. On the contrary, in solid electrolytic capacitors A1 to A4, because the oxidizer solution does not include paratoluenesulfonic acid iron, a conductive path by an iron ion is not formed, so that the effect of suppressing the leakage current is not reduced.

Furthermore, the rate of the number of solid electrolytic capacitors having leakage current of not more than the reference value in each of solid electrolytic capacitors A1 to A5 of each of Examples is higher value than 14.1% that is the rate in solid electrolytic capacitor Y1 of Comparative Example 1. In Comparative Example 1, electroconductive polymer layer 3 does not contain an oxide of a valve metal. This shows that when electroconductive polymer layer 3 contains an oxide of a valve metal, leakage current can be suppressed.

When a oxide of a valve metal exists throughout first electroconductive polymer layer 3a, it means that the oxide of the valve metal exists also in the inside of defective portion 2a of dielectric layer 2. Therefore, oxide of valve metal 20 that is an insulating material prevents a conductive route from being formed when first electroconductive polymer layer 3a and anode 1 are brought into contact with each other via defective portion 2a, thus suppressing generation of leakage current.

When a salt of a valve metal exists throughout first electroconductive polymer layer 3a, it means that the salt of the valve metal exists also in the inside of defective portion 2a of dielectric layer 2. Therefore, valve metal ions generated from the salt of the valve metal react with oxygen in first electroconductive polymer layer 3a, and an oxide of a valve metal is formed in the inside of defective portion 2a of dielectric layer 2. In particular, in the aging treatment, a minute amount of electric current flows in defective portion 2a of dielectric layer 2, and the reaction between the valve metal ion and oxygen proceeds. Therefore, an oxide of a valve metal is easily formed in defective portion 2a of dielectric layer 2. Thus, generation of leakage current can be suppressed.

Furthermore, when a oxide of a valve metal exists at least in the inside of defective portion 2a of dielectric layer 2, it means that the oxide of the valve metal exists also in the inside of defective portion 2a of dielectric layer 2. Therefore, generation of leakage current can be suppressed by the above-mentioned advantageous effects.

Furthermore, when a salt of a valve metal exists at least in the inside of defective portion 2a of dielectric layer 2, it means that the salt of the valve metal exists in the inside of defective portion 2a of dielectric layer 2. Therefore, generation of leakage current can be suppressed by the above-mentioned advantageous effects.

Furthermore, even if dielectric layer 2 does not have defective portion 2a, when first electroconductive polymer layer 3a includes an oxide of a valve metal, generation of leakage current can be suppressed because the oxide of the valve metal has an insulating property. Improving the capacity by thinning dielectric layer 2 has a problem that leakage current is increased. In this case, when dielectric layer 2 is allowed to include an oxide of a valve metal or the like as in the invention of the present application, leakage current can be reduced. Therefore, a solid electrolytic capacitor capable of improving the capacity and reducing leakage current can be provided.

When the dielectric layer has a defective portion, the leakage current value becomes larger, so that improvement effect by the invention of the present application becomes larger.

Note here that in the above-mentioned exemplary embodiment, an electroconductive polymer layer is used as a solid electrolyte layer, but material having conductivity, for example, inorganic oxide such as manganese dioxide may be used.

Furthermore, in the above-mentioned exemplary embodiment, a two-layer structured electroconductive polymer layer 3 composed of first electroconductive polymer layer 3a and second electroconductive polymer layer 3b is used. However, the structure is not necessarily limited to the two-layer structure in the exemplary embodiment mentioned above, and a single-layer structure or a three-layer structure may be employed.

Furthermore, in the above-mentioned exemplary embodiment, porous material obtained by sintering valve metal particles is used as anode 1, but a plate or a foil of valve metal or an alloy thereof may be used. Furthermore, in order to increase a surface area of the anode, a plate or a foil the surface of which is etched, a plate or a foil on the surface of which porous material obtained by sintering valve metal particles is unitarily formed, may be used. In addition, a plate or a foil of valve metal or an alloy thereof, which is laminated or rolled, may be used as anode 1.

Furthermore, in the above-mentioned exemplary embodiment, washing of a solid electrolyte layer with a washing solution including citric acid or the like is not carried out, but such washing may be added in the exemplary embodiment.

The invention claimed is:

1. A solid electrolytic capacitor comprising:
   an anode;
   a dielectric layer formed on the anode; and
   a solid electrolyte layer including solid electrolyte formed on the dielectric layer, wherein:
   the solid electrolyte layer includes an insulating particle made of an oxide of a valve metal,
   a surface of the insulating particle contacts with the dielectric layer or the solid electrolyte, and
   the solid electrolyte layer includes a salt of a valve metal in addition to the insulating particle.

2. The solid electrolytic capacitor according to claim 1, wherein the salt of the valve metal is a vanadyl compound.

3. The solid electrolytic capacitor according to claim 2, wherein the vanadyl compound is vanadyl sulfate or vanadyl oxalate.

4. The solid electrolytic capacitor according to claim 1, wherein the oxide of the valve metal is vanadium pentoxide.

5. The solid electrolytic capacitor according to claim 1, wherein the insulating particle exists at a defective portion of the dielectric layer.

6. A solid electrolytic capacitor comprising:
   an anode;
   a dielectric layer formed on the anode; and
   a solid electrolyte layer formed on the dielectric layer, wherein:
   the solid electrolyte layer includes an oxide of a valve metal,
   the solid electrolyte layer includes a first electroconductive polymer layer disposed on a surface which opposite to a surface facing the anode in the dielectric layer and a second electroconductive polymer layer disposed on a surface opposite to a surface facing the dielectric layer in the first electroconductive polymer layer, and
   the first electroconductive polymer layer includes the oxide of the valve metal and the second electroconductive polymer layer does not include the oxide of the valve metal.

7. The solid electrolytic capacitor according to claim 6, wherein the solid electrolyte layer includes a salt of a valve metal in addition to the oxide of the valve metal.

8. The solid electrolytic capacitor according to claim 7, wherein the salt of the valve metal is a vanadyl compound.

9. The solid electrolytic capacitor according to claim 8, wherein the vanadyl compound is vanadyl sulfate or vanadyl oxalate.

10. The solid electrolytic capacitor according to claim 6, wherein the oxide of the valve metal is vanadium pentoxide.

11. The solid electrolytic capacitor according to claim 6, wherein the oxide of the valve metal exists at a defective portion of the dielectric layer.

12. The solid electrolytic capacitor according to claim 6, wherein the oxide of the valve metal is an insulating material.

13. A solid electrolytic capacitor comprising:
an anode;
a dielectric layer formed on the anode; and
a solid electrolyte layer formed on the dielectric layer, wherein:
the solid electrolyte layer includes an oxide of a valve metal, and
the solid electrolyte layer includes vanadyl sulfate or vanadyl oxalate in addition to the oxide of the valve metal.

14. The solid electrolytic capacitor according to claim 13, wherein the oxide of the valve metal is vanadium pentoxide.

15. The solid electrolytic capacitor according to claim 13, wherein the oxide of the valve metal exists at a defective portion of the dielectric layer.

16. The solid electrolytic capacitor according to claim 13, wherein the oxide of the valve metal is an insulating material.

17. A solid electrolytic capacitor comprising:
an anode;
a dielectric layer formed on the anode; and
a solid electrolyte layer including solid electrolyte formed on the dielectric layer, wherein:
the solid electrolyte layer includes an insulating particle made of an oxide of a valve metal,
a surface of the insulating particle contacts with the dielectric layer or the solid electrolyte, and
the oxide of the valve metal is vanadium pentoxide.

18. A solid electrolytic capacitor comprising:
an anode;
a dielectric layer formed on the anode; and
a solid electrolyte layer formed on the dielectric layer, wherein:
the solid electrolyte layer includes an oxide of a valve metal,
an amount of the oxide of the valve metal near a side of the solid electrolyte layer facing the dielectric layer is no less than that of the oxide of the valve metal near the opposite side of the solid electrolyte to the side facing the dielectric layer, and
the oxide of the valve metal exists at a defective portion of the dielectric layer.

* * * * *